(12) United States Patent
Posamentier

(10) Patent No.: US 7,817,044 B2
(45) Date of Patent: Oct. 19, 2010

(54) RFID ENABLED MULTIBAND ANTENNA

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 1356 days.

(21) Appl. No.: 11/289,921

(22) Filed: Nov. 30, 2005

(65) Prior Publication Data

US 2007/0120678 A1    May 31, 2007

(51) Int. Cl.
G08B 13/14    (2006.01)

(52) U.S. Cl. ............. 340/572.7; 340/572.1; 340/572.2; 340/572.4; 340/10.1; 343/700 R; 455/78; 455/83

(58) Field of Classification Search ............. 340/572.7, 340/572.1, 572.2, 572.4, 10.1, 10.2, 10.4; 336/136, 144, 150; 455/73, 77, 78, 83; 343/700 MS, 343/702, 765, 700 R
See application file for complete search history.

(56) References Cited

U.S. PATENT DOCUMENTS

| | | | |
|---|---|---|---|
| 7,126,481 B2 * | 10/2006 | Vesikivi et al. | 340/572.4 |
| 7,280,043 B2 * | 10/2007 | Tsen et al. | 340/572.1 |
| 7,283,044 B2 * | 10/2007 | Bandy | 340/505 |
| 7,299,987 B2 * | 11/2007 | Yoo et al. | 235/472.01 |
| 7,403,744 B2 * | 7/2008 | Bridgelall | 455/41.2 |
| 7,423,525 B2 * | 9/2008 | Bandy | 340/505 |
| 7,489,240 B2 * | 2/2009 | Soliman | 340/572.1 |
| 7,492,254 B2 * | 2/2009 | Bandy et al. | 340/540 |
| 7,522,106 B2 * | 4/2009 | Lim et al. | 343/700 MS |
| 2004/0177032 A1 * | 9/2004 | Bradley et al. | 705/38 |
| 2005/0127156 A1 | 6/2005 | Yoo et al. | |
| 2005/0255839 A1 * | 11/2005 | Perttila | 455/419 |
| 2006/0103535 A1 * | 5/2006 | Pahlaven et al. | 340/572.1 |

FOREIGN PATENT DOCUMENTS

TW    0476923    2/2002

OTHER PUBLICATIONS

U.S. Appl. No. 11/007,898 (Posamentier et al) filed Dec. 8, 2005.
U.S. Appl. No. 11/184,437 (Posamentier) filed Jul. 19, 2005.
U.S. Appl. No. 11/134,214 (Posamentier) filed May 19, 2005.
U.S. Appl. No. 11/137,748 (Posamentier) filed May 24, 2005.
Non-Final Office Action Mailed Jan. 29, 2010, Taiwan Patent Application No. 95143054.

* cited by examiner

Primary Examiner—Davetta W Goins
(74) Attorney, Agent, or Firm—Kacvinsky Daisak, PLLC

(57) ABSTRACT

According to some embodiments, an antenna sub-assembly includes a multi-band antenna coupled to a radio frequency identification (RFID) integrated circuit (IC). The multi-band antenna is tuned to receive radio frequency (RF) signals of an RFID frequency band and RF signals of a non-RFID frequency band.

15 Claims, 3 Drawing Sheets

RFID ENABLED MULTIBAND ANTENNA

BACKGROUND

Description of the Related Art

Radio frequency identification (RFID) technology is being explored and expanded. An RFID tag may be an integrated circuit with a tag insert or an inlay including an integrated circuit attached to an antenna. The tag may be passive or active. Passive RFID tags typically have no power source, and rely upon the energy delivered by an interrogation signal to transit a stream of information. Active RFID tags may have a power source such as a direct current (DC) battery. The antenna for common 900 mHz RFID tags is typically of poor quality and uses a significant amount of space.

An RFID reader/writer sends out electromagnetic waves to an RFID tag that either induces a current in the antenna of a tag with an inductively coupled antenna or induces a voltage potential in the antenna of a tag with an electric field couples antenna. The RFID reader/writer may be a fixed device or a portable device. The tag modulates the waves and may send information back to the RFID reader/writer via backscatter modulation. Additional information about the items the tag is attached to can be stored on the tag and in some instances updated dynamically. Information may be exchanged between the tag and the RFID reader/writer through either inductive load modulation or electric field backscatter. RFID systems may use many different frequencies, but generally the most common are low frequency (LF, around 125 KHz), high frequency (HF, 13.56 MHz), ultra-high frequency (UHF, 850-950 MHz), and microwave (2.40-2.48 Ghz).

RFID tags may be utilized to determine the current location of articles of interest, inventory control and tracking, asset tracking and recovery, tracking manufacturing parts, tracking goods in supply chains, payment systems, and the like. An RFID tag may store information that may be used for security, access control, and/or authentication purposes.

New uses of RFID technology are the subject of many research and development projects.

DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that-the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, state machine and the like that manipulate and/or transform data represented as physical, such as electronic, quantities into other data similarly represented as physical quantities.

Figure 1:
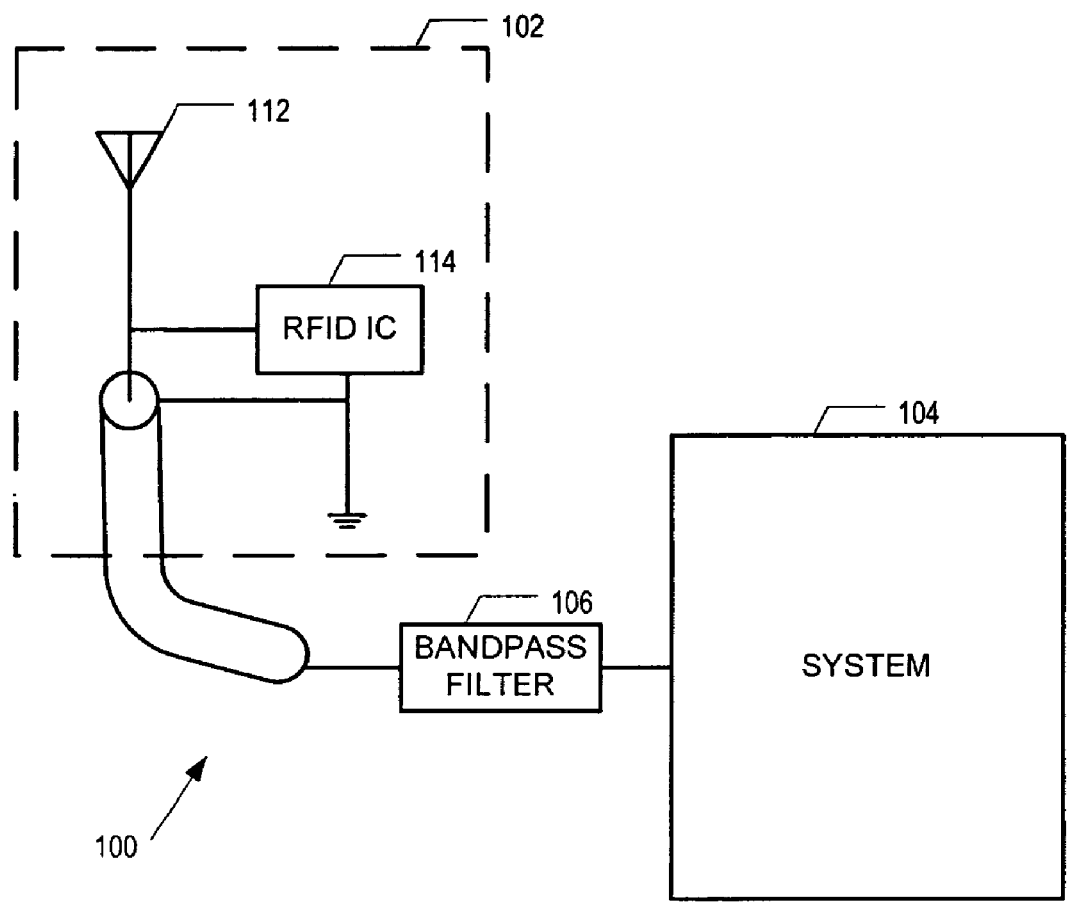
FIG. 1 illustrates a novel use of radio frequency identification (RFID) technology according to an embodiment of the present invention.

FIG. 1 illustrates a novel use of radio frequency identification (RFID) technology according to an embodiment of the present invention. System 100 includes an antenna sub-assembly 102 coupled to a system 104. A band-pass filter 106 may be coupled between antenna sub-assembly 102. Alternatively, band-pass filter 106 may be incorporated as part sub-assembly 102 or system 104.

Antenna sub-assembly 102 includes an antenna 112 coupled to a RFID integrated circuit (IC) 114. Antenna 112 is a multi-band antenna, that is, antenna 112 is tuned to receive RF signals of at least two distinct frequency bands. Antenna 112 may be a dual dipole element, monopole element, patch, PIFA, fractal antenna, or any other type of antenna. Preferably, antenna 112 is linear in polarization, however embodiments of the invention are not limited to linear polarization.

RFID IC 114 is similar to RFID ICs used in passive UHF RFID tags. RFID IC 114 may be coupled to antenna 112 in a variety of ways, for example, mounted on a substrate, wire-bonded to parts of antenna 112 or placed on a stamped or etched metal lead-frame. RFID IC 114 may be integrated with antenna 112 during the antenna manufacturing process, before being coupled to system 104.

RFID signals may be received by antenna 112 and processed by RFID IC 114. Other RF signals, for example, wireless local area network (WLAN) or cellular signals may be received by antenna 112 and processed by system 104. Band-pass filter 106 attenuates any RFID signals for system 104. Band-pass filter 106 may be any filter technology, including SAW, Ceramic, PCB, and the like.

With the use of antenna sub-assembly 102, system 104 may be RFID tagged with a relatively high fidelity antenna while adding no circuitry or complication to system 104. Embedding RFID IC 114 within antenna sub-assembly 102 potentially benefits the entire platform by reducing board complexity and eliminating a second antenna.

According to one embodiment of the present invention, legacy systems can be easily upgraded with RFID tag technology by exchanging an existing antenna with an antenna sub-assembly embedded with an RFID IC. Embedding an RFID IC in an antenna sub-assembly saves both cost and space. Using a higher quality antenna (compared to typical low quality, inexpensive tag antennas found on passive RFID tags) coupled with deliberate placement will yield a higher performing, more robust RFID tag interface.

According to one embodiment of the invention, RFID IC 114 may harvest power from multiple frequency bands rather than just the RFID band, improving range and read performance.

Figure 2:
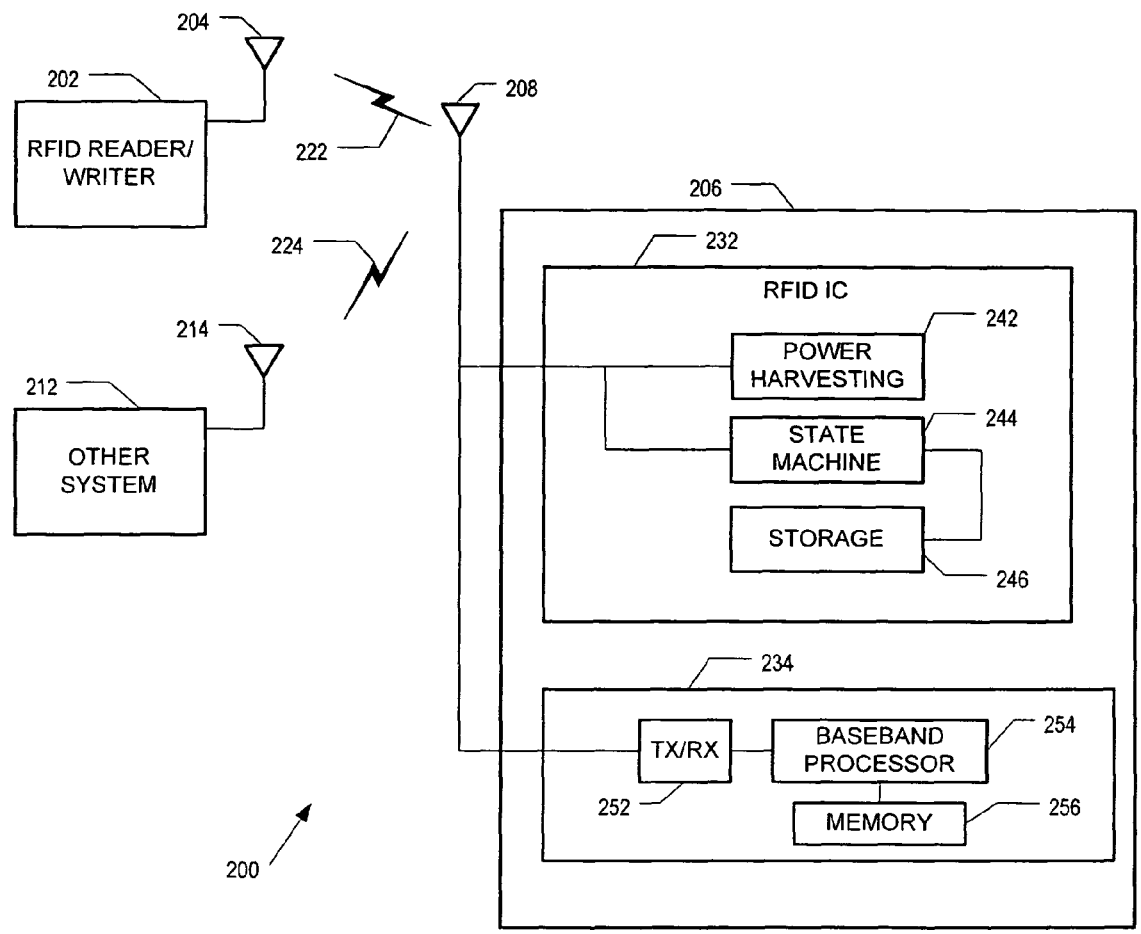
FIG. 2 illustrates a system utilizing an antenna sub-assembly according to an embodiment of the present invention.

FIG. 2 illustrates a system utilizing an antenna sub-assembly according to an embodiment of the present invention. System 200 includes an RFID reader/writer 202 having antenna 204, a system 206 having antenna 208, and another system 212 having antenna 214. Antenna 208 may be a multi-band antenna tuned to RFID wavelength and at least one other wavelength, for example a WLAN or cellular wavelength. RFID reader/writer 202 communicates with system 206 via an RFID frequency signal 222. System 212 communicates with system 206 via another RF frequency signal 224.

System 206 includes a RFID IC 232 and sub-system 234 coupled to antenna 208. RFID IC 232 receives and processes RFID signal 222 from RFID reader/writer 202. RFID IC 232 may include power harvesting and voltage processing circuitry 242, a processor or state machine 244, and storage 246. Power harvesting and voltage processing circuitry 242 may include protection circuitry such as a diode (not shown) and a voltage regulator (not shown) and an inductor (not shown) to receive RFID signal 222 and charge one or more capacitors (not shown) to generate power to operate RFID IC 232, although embodiments of the invention are not limited in this context. Storage 246 may include non-volatile re-writable memory, although embodiments of the invention are not limited in this context. Storage 246 may also contain a key for decryption, a device identification for signal authentication, and other such information. To access RFID IC 232, an interrogation signal may be transmitted by RFID reader/writer 202 in a vicinity of antenna 208.

Sub-system 234 may include a wireless receive and transmit subsystem 252 to couple to antenna 208 and to a baseband processor 254. Baseband processor 254 in one embodiment may include a single processor, or alternatively may include a baseband processor and an applications processor, although the scope of the invention is not limited in this respect. Baseband processor 254 may couple to a memory 256 which may include volatile memory such as DRAM, non-volatile memory such as flash memory, or alternatively may include other types of storage such as a hard disk drive, although the scope of the invention is not limited in this respect.

Sub-system 234 communicates to system 212 which may be a mobile unit (MU). In some embodiments, sub-system 234 and system 212 may transmit and/or receive one or more packets over link 224 via antennas 208 and 214. Alternatively, sub-system 234 and system 212 may include two or more antennas to provide a diversity antenna arrangement, to provide spatial division multiple access (SDMA), or to provide a multiple input, multiple output (MIMO) system, or the like, although the scope of the invention is not limited in this respect. The packets may include data, control messages, network information, and the like.

System 206 and system 212 may be any of various devices, such as a cellular telephone, wireless telephone headset, printer, wireless keyboard, mouse, wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), portable or stationary personal computers (PCs), personal digital assistants (PDAs), software defined radios, reconfigurable radios, or other device capable of communicating over a wireless network.

Figure 3:
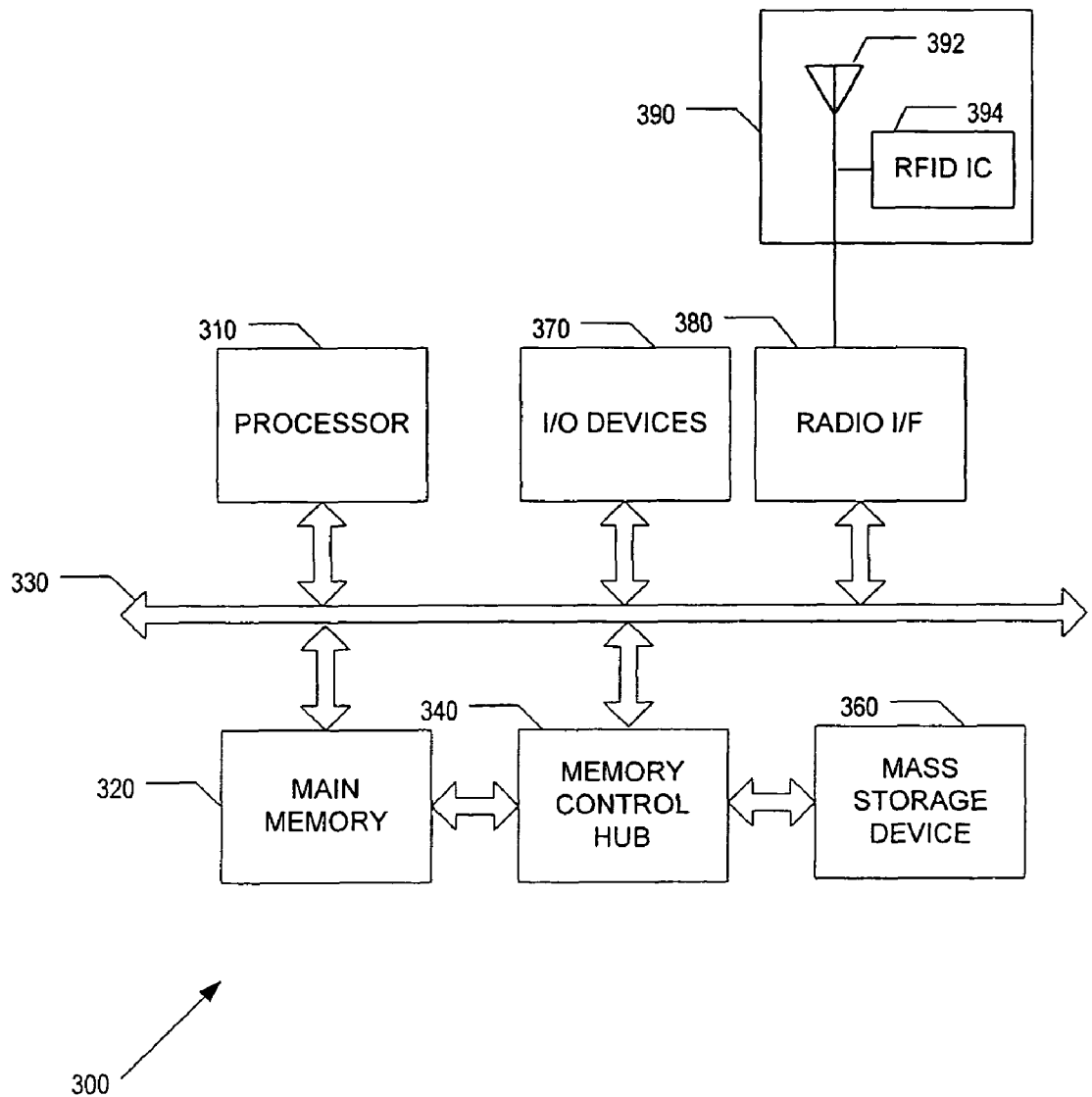
FIG. 3 illustrates another system utilizing an antenna sub-assembly according to an embodiment of the present invention.

FIG. 3 illustrates another system utilizing an antenna sub-assembly according to an embodiment of the present invention. System 300 includes a processor 310 coupled to a main memory 320 by a bus 330. Main memory 320 may include a random-access-memory (RAM) and be coupled to a memory control hub 340. Memory control hub 340 may also be coupled to bus 330 and to a mass storage device 360. Mass storage device 360 may be a hard disk drive, a floppy disk drive, a optical media drive, a Flash memory (NAND and NOR types, including multiple bits per cell), or any other existing or future memory device for mass storage of information. Memory control hub 340 controls the operations of main memory 320, and mass storage device 360. A number of input/output devices 370 such as a keyboard, mouse and/or display may be coupled to bus 330. A radio interface circuitry 380 may also be coupled to bus 330. Radio interface circuitry 380 may be coupled to antenna sub-assembly 385. Antenna sub-assembly 390 includes an antenna 392 and a RFID integrated circuit 394.

Although system 300 is illustrated as a system with a single processor, other embodiments may be implemented with multiple processors, in which additional processors may be coupled to the bus 330. In such cases, each additional processor may share main memory 320 for writing data and/or instructions to and reading data and/or instructions from the same.

The multi-band antenna according to embodiments of the present invention may be tuned for a variety of wireless communications in addition to RFID communications. Such types of wireless communication systems are intended to be within the scope of the present invention including, although not limited to, Wireless Local Area Network (WLAN), Wireless Wide Area Network (WWAN), Worldwide Interoperability for Microwave Access (WiMax), Wireless Personal Area Network (WPAN), Wireless Metropolitan Area Network (WMAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, Universal Mobile Telecommunications System (UMTS), and the like, although the scope of the invention is not limited in this respect. In at least one implementation, for example, a wireless link is implemented in accordance with the Bluetooth short range wireless protocol (Specification of the Bluetooth System, Version 1.2, Bluetooth SIG, Inc., November 2003, and related specifications and protocols). Other possible wireless networking standards include, for example: IEEE 802.11 (ANSI/IEEE Std 802.11-1999 Edition and related standards), IEEE 802.15.4 (ANSI/IEEE Std 802.15.4-2003 aka Zigbee), IEEE 802.16 (ANSI/IEEE Std 802.16-2002, IEEE Std 802.16a, March, 2003 and related standards), HIPERLAN 1, 2 and related standards developed by the European Telecommunications Standards Institute (ETSI) Broadband Radio Access Networks (BRAN), HomeRF (HomeRF Specification, Revision 2.01, The HomeRF Technical Committee, July, 2002 and related specifications), and/or others.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An apparatus comprising:
   an antenna tuned to receive a first radio frequency (RF) signal of a radio frequency identification (RFID) frequency band and tuned to receive a second RF signal of a non-RFID frequency band; and
   an RFID integrated circuit (IC) coupled to the antenna to receive the first RF signal and configured to harvest power from the first RF signal.

2. The apparatus as recited in claim 1, wherein the RFID IC is configured to harvest further power from the second RF signal.

3. The apparatus as recited in claim 1, further comprising a band-pass filter to attenuate the first RF signal from the second RF signal.

4. A system comprising:
   an antenna tuned to receive a first radio frequency (RF) signal of an RFID frequency band and tuned to receive a second RF signal of a non-RFID frequency band;
   a radio frequency identification (RFID) integrated circuit (IC) coupled to the antenna to receive the first RF signal and configured to harvest power from the first RF signal; and
   a sub-system coupled to the antenna to receive the second RF signal.

5. The system as recited in claim 4, wherein the RFID IC is configured to harvest further power from the second RF signal.

6. The system as recited in claim 4, further comprising a band-pass filter to attenuate the first RF signal from the second RF signal for the sub-system.

7. The system as recited in claim 4, wherein the sub-system is configured to send and receive packets via the antenna.

8. The system as recited in claim 4, wherein the non-RFID frequency band is a wireless wide area network frequency band.

9. The system as recited in claim 4, wherein the non-RFID frequency band is a wireless local area network (WLAN) frequency band.

10. The system as recited in claim 4, the RFID IC comprising memory to store information about the sub-system.

11. A method comprising:
    receiving a first radio frequency (RF) signal on an antenna, the first RF signal of a radio frequency identification (RFID) frequency band;
    harvesting power from the first RF signal to power an RFID integrated circuit (IC);
    receiving a second RF signal on the antenna, the second RF signal of a non-RFID frequency band; and
    harvesting additional power from the second RF signal to power the RFID IC.

12. The method as recited in claim 11, further comprising attenuating the first RF signal from the second RF signal for a sub-system.

13. The method as recited in claim 11, wherein the second RF signal comprises one or more cellular packets.

14. The method as recited in claim 11, wherein the second RF signal comprises one or more wireless local area network (WLAN) packets.

15. The method as recited in claim 11, further comprising storing data from the first RF signal in memory on the RFID IC, wherein the data includes information about a sub-system coupled to the antenna.

* * * * *